(12) United States Patent
Li (10) Patent No.: US 8,125,441 B2
(45) Date of Patent: Feb. 28, 2012

(54) DISCRIMINATING AMONG ACTIVATION OF MULTIPLE BUTTONS

(75) Inventor: Guanghai Li, Shanghai (CN)

(73) Assignee: Cypress Semiconductor Corporation, San Jose, CA (US)

( * ) Notice: Subject to any disclaimer, the term of this patent is extended or adjusted under 35 U.S.C. 154(b) by 1105 days.

(21) Appl. No.: 11/986,255

(22) Filed: Nov. 19, 2007

(65) Prior Publication Data

US 2008/0143671 A1    Jun. 19, 2008

Related U.S. Application Data

(60) Provisional application No. 60/860,334, filed on Nov. 20, 2006.

(51) Int. Cl.
  *G09G 5/00*    (2006.01)
(52) U.S. Cl. ...... 345/156; 345/168; 345/173; 178/18.03
(58) Field of Classification Search ...... 345/22, 345/156, 173–177, 168–169; 178/18.01–20.04; 341/20–33
  See application file for complete search history.

(56) References Cited

U.S. PATENT DOCUMENTS

| | | | |
|---|---|---|---|
| 4,293,734 A | 10/1981 | Pepper, Jr. | |
| 4,736,191 A | 4/1988 | Matzke et al. | |
| 5,153,572 A * | 10/1992 | Caldwell et al. | 345/174 |
| 5,305,017 A * | 4/1994 | Gerpheide | 345/174 |
| 5,424,730 A * | 6/1995 | Sasaki et al. | 341/25 |
| 5,543,590 A | 8/1996 | Gillespie et al. | |
| 6,046,722 A * | 4/2000 | McKiel, Jr. | 715/862 |
| 6,188,391 B1 | 2/2001 | Seely et al. | |
| 6,380,931 B1 | 4/2002 | Gillespie et al. | |
| 6,704,005 B2 | 3/2004 | Kato et al. | |
| 7,064,682 B2 * | 6/2006 | Fedigan | 341/29 |
| 7,123,241 B2 * | 10/2006 | Bathiche | 345/168 |
| 7,348,967 B2 * | 3/2008 | Zadesky et al. | 345/173 |
| 7,489,306 B2 * | 2/2009 | Kolmykov-Zotov et al. | 345/173 |
| 2002/0130842 A1 * | 9/2002 | Lim | 345/168 |
| 2006/0066582 A1 | 3/2006 | Lyon et al. | |
| 2006/0197750 A1 * | 9/2006 | Kerr et al. | 345/173 |

OTHER PUBLICATIONS

Ryan Seguine, et al., "Layout Guidelines for PSoC™ CapSense™", Cypress Application Note AN2292, Revision B, Oct. 31, 2005, pp. 1-15.
Dennis Seguine, "Capacitive Switch Scan", Cypress Application Note AN2233a, Revision B, Apr. 14, 2005, pp. 1-6.
Dave Van Ess, "Understanding Switched Capacitor Analog Blocks", Cypress Application Note AN2041, Revision B, Mar. 30, 2004, pp. 1-16.
Mark Lee, "CapSense Best Practices", Cypress Application Note AN2394, Rev.**, Oct. 19, 2006, pp. 1-10.
CSR User Module Data Sheet, CSR v1.0, CY8C21x34 Data Sheet, Oct. 6, 2006, pp. 1-36.
CSD User Module Data Sheet, CSD v1.0, Oct. 23, 2006, pp. 1-58.

* cited by examiner

*Primary Examiner* — Alexander Eisen
*Assistant Examiner* — Sanjiv D Patel

(57) ABSTRACT

An apparatus and method of discrimination among activation of multiple capacitive sensor buttons in close proximity to each other is described.

20 Claims, 8 Drawing Sheets

| SENSOR A PRESENCE | SENSOR B PRESENCE | DIFFERENCE COUNT DELTA BETWEEN DIFF COUNT OF A AND DIFF COUNT OF B | RESULT |
|---|---|---|---|
| ON | OFF | N/A | SENSORS OFF |
| OFF | ON | N/A | SELECT SENSOR B |
| ON | OFF | N/A | SELECT SENSOR A |
| ON | ON | ABOVE DIFFERENCE THRESHOLD | SELECT A OR B WITH LARGEST DIFF COUNT |
| ON | ON | BELOW DIFFERENCE THRESHOLD | OMIT BUTTONS OR SELECT BASED ON PRIORITY |

DISCRIMINATING AMONG ACTIVATION OF MULTIPLE BUTTONS

RELATED APPLICATION

This application claims the benefit of U.S. Provisional Application No. 60/860,334, filed Nov. 20, 2006, hereby incorporated by reference.

TECHNICAL FIELD

The present invention relates generally to a user interface (UI) device and, more particularly, to a touch-sensor device.

BACKGROUND

Figure 1:
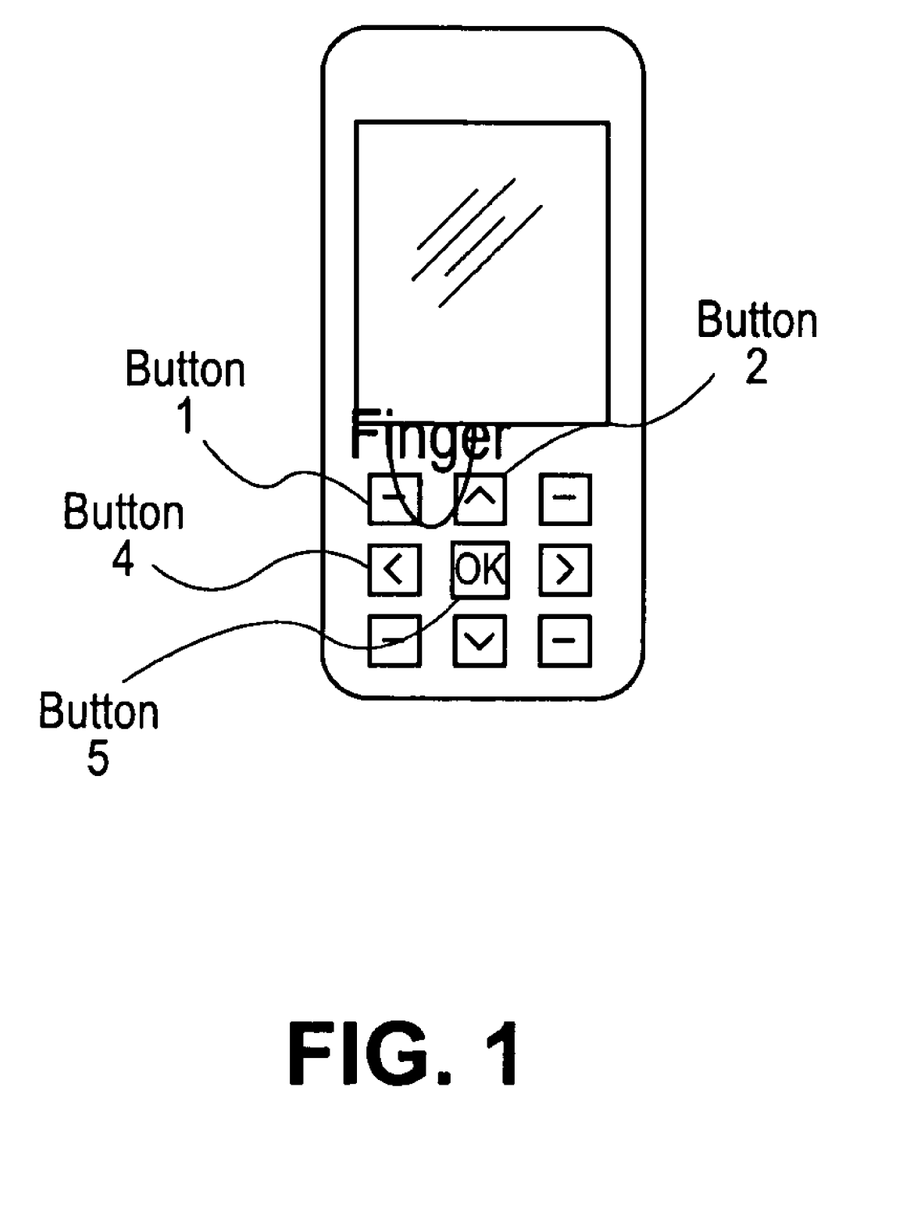
FIG. 1 illustrates one embodiment of a conventional mobile handset.

Computing devices, such as notebook computers, personal data assistants (PDAs), kiosks, and mobile handsets, have user interface devices, which are also known as human interface devices (HID). One user interface device that has become more common is a touch-sensor pad (also commonly referred to as a touchpad). A basic notebook computer touch-sensor pad emulates the function of a personal computer (PC) mouse. A touch-sensor pad is typically embedded into a PC notebook for built-in portability. A touch-sensor pad replicates mouse x/y movement by using two defined axes which contain a collection of sensor elements that detect the position of a conductive object, such as a finger. Mouse right/left button clicks can be replicated by two mechanical buttons, located in the vicinity of the touchpad, or by tapping commands on the touch-sensor pad itself. The touch-sensor pad provides a user interface device for performing such functions as positioning a pointer, or selecting an item on a display. A touch-sensor pad may also include buttons that permit a user to select items on a display or send other commands to the computing device such as a mobile handset A mobile handset (e.g., a cell phone) has a limited area in which buttons may be disposed. As illustrated in FIG. 1, the buttons in a mobile handset may be close to each other such that one touch by the finger of a user may trigger two buttons: a button desired to be pressed (e.g., button 1) and an unintended button (e.g., button 2). This issue often happens when a user inputs character or number quickly.

Figure 2:
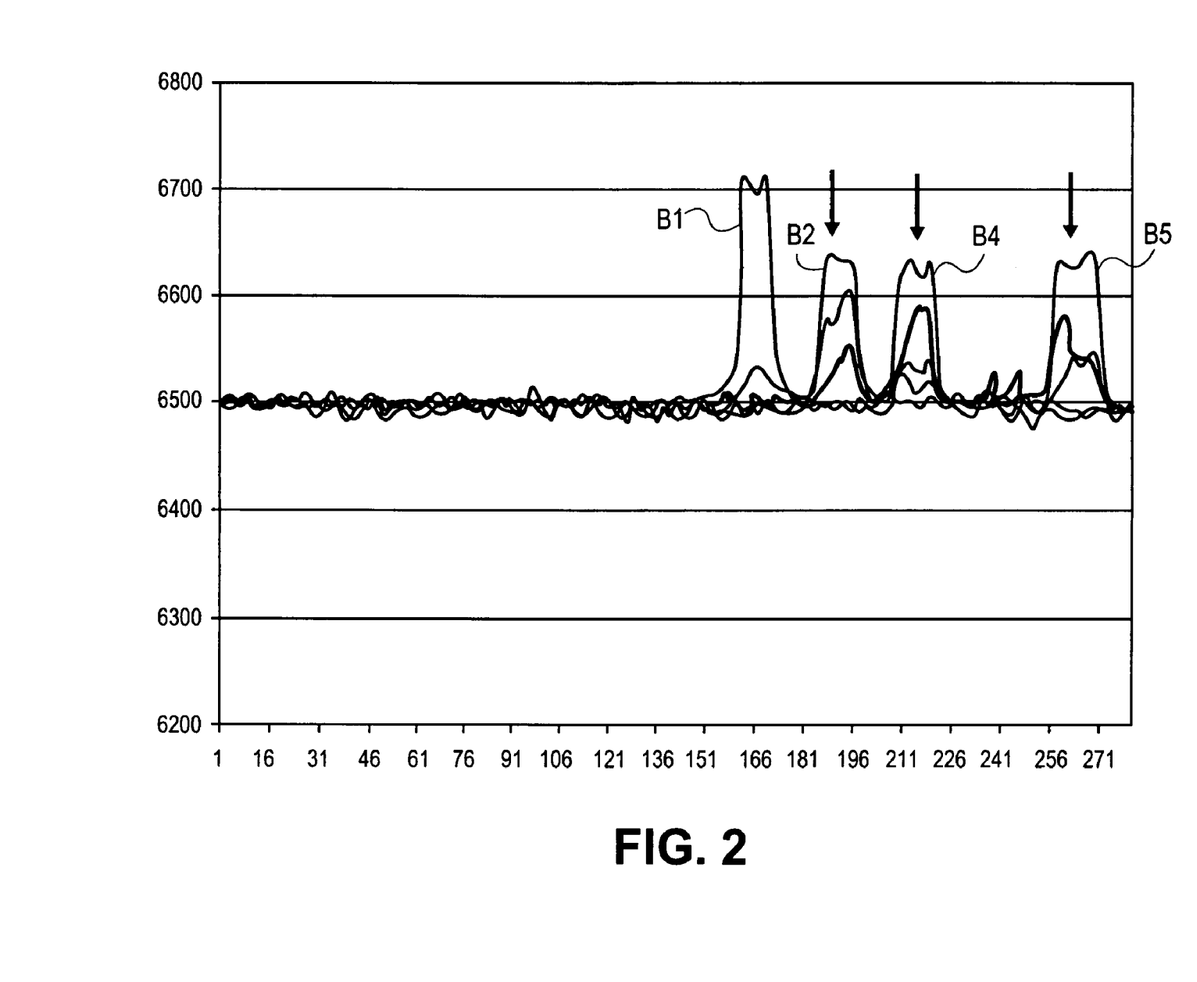
FIG. 2 illustrates the miss triggering of buttons on the mobile handset of FIG. 1.

Some touch pads or buttons that have a capacitive sensor may utilize a capacitive sensor relaxation oscillators (CSR) to measure capacitance in terms of raw counts (e.g., the higher the capacitance the higher the raw counts determined by the CSR) during periods of oscillation. FIG. 2 illustrates the raw counts of eight buttons on the mobile handset of FIG. 1. When a user touches one button (e.g., button 1), other close buttons can sometimes be unintentionally triggered (e.g., button 2, button 4 and button 5). Such a "miss triggers" of unintended button activation is shown with straight arrows in FIG. 2. One solution to addressing miss triggers of buttons is to enlarge the distance between adjacent buttons. However, such a solution may reduce the button area and sensitivity of the device.

BRIEF DESCRIPTION OF THE DRAWINGS

The present invention is illustrated by way of example, and not by way of limitation, in the figures of the accompanying drawings.

DETAILED DESCRIPTION

Described herein are apparatuses and methods for discriminating between a first signal from a user interface indicative of interaction at a first location and a second signal indicative of interaction at a second location. The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the spirit and scope of the present invention.

An apparatus and method of discrimination among activation of multiple capacitive sensor buttons in close proximity to each other is described. In one embodiment, detection of button activation may be performed utilizing a capacitive switch relaxation oscillator (CSR). The CSR may be coupled to an array of sensor element buttons using a current-programmable relaxation oscillator, an analog multiplexer, digital counting functions, and high-level software routines as discussed in further detail below. However, it should be noted that there are various known methods for measuring capacitance with a capacitance sensor. Although some embodiments herein are described using a relaxation oscillator, the present embodiments are not limited to using relaxation oscillators, but may include other methods known in the art, such as current versus voltage phase shift measurement, resistor-capacitor charge timing, capacitive bridge divider, charge transfer, sigma-delta modulators, charge-accumulation circuits, or the like. Additional details regarding these alternative embodiments are not included so as to not obscure the present embodiments, and because these alternative embodiments for measuring capacitance are known by those of ordinary skill in the art.

Figure 3A:
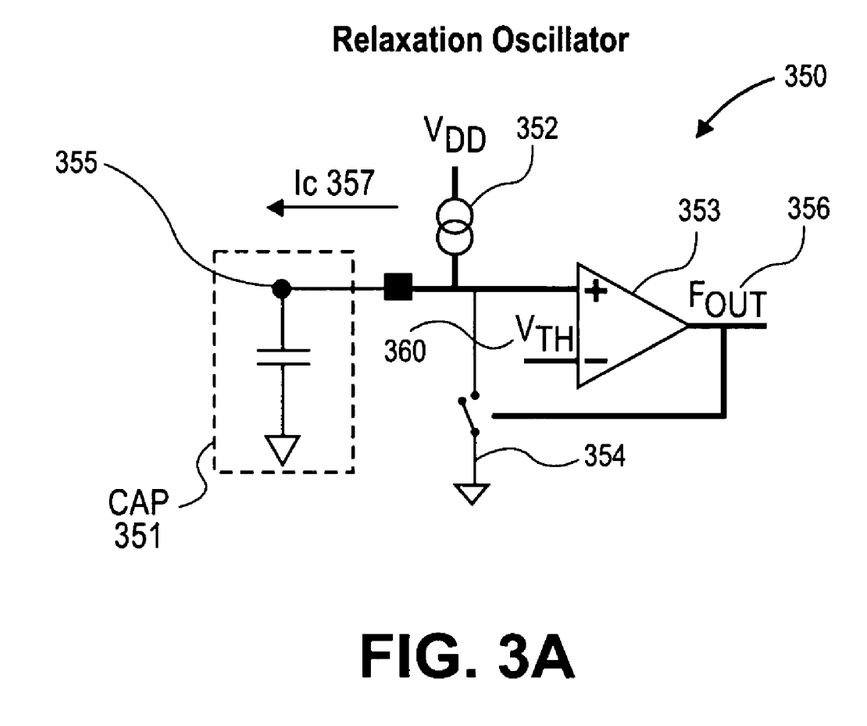
FIG. 3A illustrates one embodiment of a relaxation oscillator for measuring a capacitance on a sensor element.

FIG. 3A illustrates one embodiment of a relaxation oscillator for measuring a capacitance on a touch sensor button 351. The relaxation oscillator 350 is formed by the capacitance to be measured on touch sensor button 351 (represented as capacitor 351), a charging current source 352, a comparator 353, and a reset switch 354 (also referred to as a discharge switch). It should be noted that capacitor 351 is representative of the capacitance measured on a sensor element. The sensor element and the one or more surrounding grounded conductors may be metal, or alternatively, the conductors may be conductive ink (e.g., carbon ink) or conductive polymers. The relaxation oscillator is coupled to drive a charging current (Ic) 357 in a single direction onto a device under test ("DUT") capacitor, capacitor 351. As the charging current piles charge onto the capacitor 351, the voltage across the capacitor increases with time as a function of Ic 357 and its capacitance C. Equation (1) describes the relation between current, capacitance, voltage, and time for a charging capacitor.

$$CdV = I_C dt \quad (1)$$

The relaxation oscillator begins by charging the capacitor 351, at a fixed current Ic 357, from a ground potential or zero voltage until the voltage across the capacitor 351 at node 355 reaches a reference voltage or threshold voltage, $V_{TH}$ 360. At the threshold voltage $V_{TH}$ 360, the relaxation oscillator allows the accumulated charge at node 355 to discharge (e.g., the capacitor 351 to "relax" back to the ground potential) and then the process repeats itself. In particular, the output of comparator 353 asserts a clock signal $F_{OUT}$ 356 (e.g., $F_{OUT}$ 356 goes high), which enables the reset switch 354. This discharges the voltage on the capacitor at node 355 to ground and the charge cycle starts again. The relaxation oscillator outputs a relaxation oscillator clock signal ($F_{OUT}$ 356) having a frequency ($f_{RO}$) dependent upon capacitance C of the capacitor 351 and charging current Ic 357.

The comparator trip time of the comparator 353 and reset switch 354 add a fixed delay. The output of the comparator 353 is synchronized with a reference system clock to guarantee that the reset time is long enough to completely discharge capacitor 351. This sets a practical upper limit to the operating frequency. For example, if capacitance C of the capacitor 351 changes, then $f_{RO}$ changes proportionally according to Equation (1). By comparing $f_{RO}$ of $F_{OUT}$ 356 against the frequency ($f_{REF}$) of a known reference system clock signal (REF CLK), the change in capacitance ($\Delta C$) can be measured. Accordingly, equations (2) and (3) below describe that a change in frequency between $F_{OUT}$ 356 and REF CLK is proportional to a change in capacitance of the capacitor 351.

$$\Delta C \propto \Delta f, \text{ where} \quad (2)$$

$$\Delta f = f_{RO} - f_{REF}. \quad (3)$$

In one embodiment, a frequency comparator may be coupled to receive relaxation oscillator clock signal ($F_{OUT}$ 356) and REF CLK, compare their frequencies $f_{RO}$ and $f_{REF}$, respectively, and output a signal indicative of the difference $\Delta f$ between these frequencies. By monitoring $\Delta f$ one can determine whether the capacitance of the capacitor 351 has changed.

In one exemplary embodiment, the relaxation oscillator 350 may be built using a programmable timer to implement the comparator 353 and reset switch 354. Alternatively, the relaxation oscillator 350 may be built using other circuiting. Relaxation oscillators are known by those of ordinary skill in the art, and accordingly, additional details regarding their operation have not been included so as to not obscure the present embodiments. The capacitor charging current for the relaxation oscillator 350 may be generated in a register programmable current output DAC (also known as IDAC). Accordingly, the current source 352 may be a current DAC or IDAC. The IDAC output current may be set by an 8-bit value provided by the processing device 210, such as from its processing core 202. The 8-bit value may be stored in a register or in memory.

In many capacitance sensor element designs, the two "conductors" of the sensing capacitor are actually adjacent sensor elements that are electrically isolated (e.g., PCB pads or traces). Typically, one of these conductors is connected to a system ground. Layouts for touch-sensor slider (e.g., linear slide sensor elements) and touch-sensor pad applications have sensor elements that may be immediately adjacent. In these cases, all of the sensor elements that are not active are connected to a system ground through the GPIO 207 of the processing device 210 dedicated to that pin. The actual capacitance between adjacent conductors is small (Cp), but the capacitance of the active conductor (and its PCB trace back to the processing device 210) to ground, when detecting the presence of the conductive object 303, may be considerably higher (Cp+Cf). The capacitance of two adjacent conductors is given by the following equation:

$$C = \varepsilon_0 \cdot \varepsilon_R \cdot \frac{A}{d} = \varepsilon_R \cdot 8.85 \cdot \frac{A}{d} \text{ pF/m} \quad (4)$$

The dimensions of equation (4) are in meters. This is a very simple model of the capacitance. The reality is that there are fringing effects that substantially increase the sensor element-to-ground (and PCB trace-to-ground) capacitance.

As described above with respect to the relaxation oscillator 350, when a finger or conductive object is placed on the sensor element, the capacitance increases from Cp to Cp+Cf so the relaxation oscillator output signal 356 ($F_{OUT}$) decreases. The relaxation oscillator output signal 356 ($F_{OUT}$) may be fed to a digital counter for measurement. There are two methods for counting the relaxation oscillator output signal 356: frequency measurement and period measurement. Additional details of the relaxation oscillator and digital counter are known by those of ordinary skill in the art. Accordingly, further description regarding them has not been included. It should noted again that the embodiments described herein are not limited to using relaxation oscillators, but may include other sensing circuitry for measuring capacitance, such as versus voltage phase shift measurement, resistor-capacitor charge timing, capacitive bridge divider, charge transfer, sigma-delta modulators, charge-accumulation circuits, or the like.

Figure 3B:
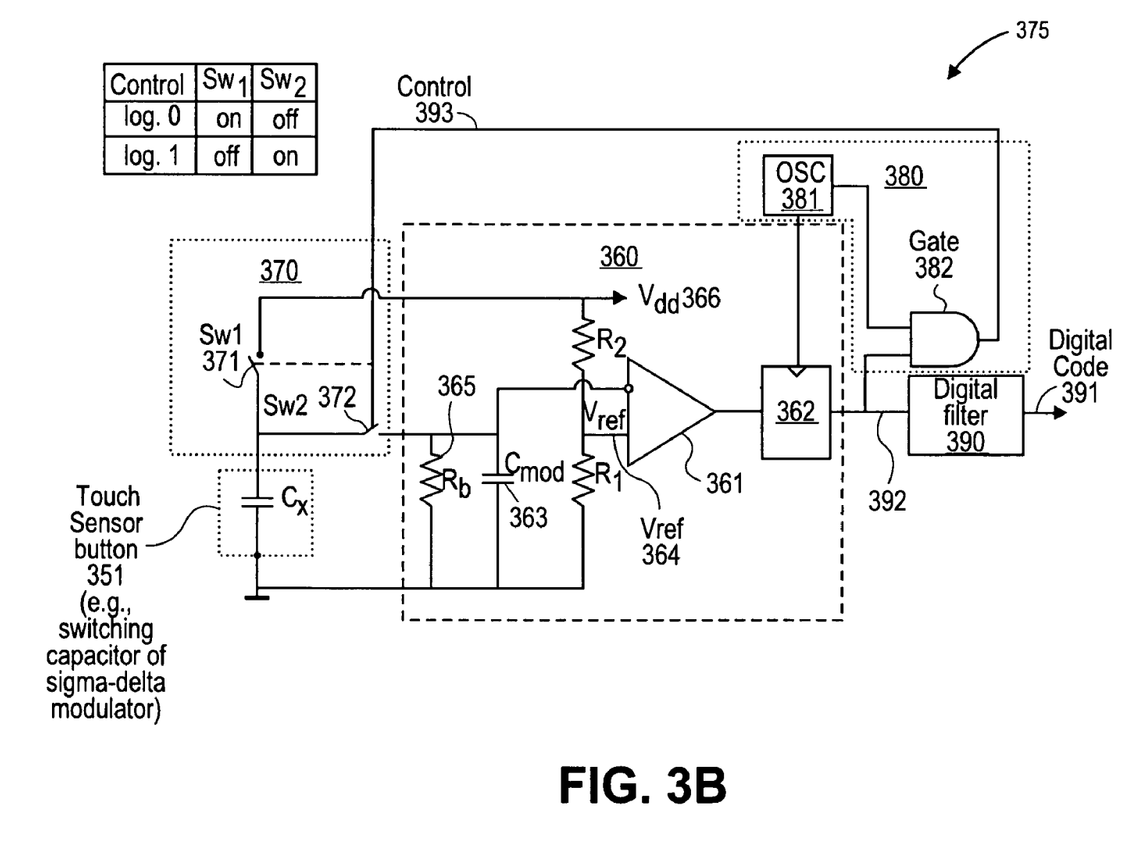
FIG. 3B illustrates a schematic of one embodiment of a circuit including a sigma-delta modulator and a digital filter for measuring capacitance on a sensor element.

FIG. 3B illustrates a schematic of one embodiment of a circuit 375 including a sigma-delta modulator 360 and a digital filter 390 for measuring capacitance on a touch sensor button 351. Circuit 375 includes a switching circuit 370, switching clock source 380, sigma-delta modulator 360, and digital filter 390 for measuring the capacitance on touch sensor button 351. Touch sensor button 351 is represented as a switching capacitor Cx in the modulator feedback loop. Switching circuit 370 includes two switches $Sw_1$ 371 and $Sw_2$ 372. The switches $Sw_1$ 371 and $Sw_2$ 372 operate in two, non-overlapping phases (also known as break-before-make configuration). These switches together with sensing capacitor $C_x$ 351 form the switching capacitor equivalent resistor, which provides the modulator capacitor $C_{mod}$ 363 of sigma-delta modulator 360 charge current (as illustrated in FIG. 3B) or discharge current (not illustrated) during one of the two phases.

The sigma-delta modulator 360 includes the comparator 361, latch 362, modulator capacitor $C_{mod}$ 363, modulator feedback resistor 365, which may also be referred to as bias resistor 365, and voltage source 366. The output of the comparator may be configured to toggle when the voltage on the modulator capacitor 363 crosses a reference voltage 364. The reference voltage 364 may be a pre-programmed value, and may be configured to be programmable. The sigma-delta modulator 360 also includes a latch 362 coupled to the output of the comparator 361 to latch the output of the comparator 361 for a given amount of time, and provide as an output, output 392. The latch may be configured to latch the output of the comparator based on a clock signal from the gate circuit 382 (e.g., oscillator signal from the oscillator 381). In another embodiment, the sigma-delta modulator 360 may include a synchronized latch that operates to latch an output of the comparator for a pre-determined length of time. The output of the comparator may be latched for measuring or sampling the output signal of the comparator 361 by the digital filter 390.

Sigma-delta modulator 360 is configured to keep the voltage on the modulator capacitor 363 close to reference voltage $V_{ref}$ 364 by alternatively connecting the switching capacitor resistor (e.g., switches $Sw_1$, 371 and $Sw_2$ 372 and sensing capacitor $C_x$ 351) to the modulator capacitor 363. The output 392 of the sigma-delta modulator 360 (e.g., output of latch 362) is feedback to the switching clock circuit 380, which controls the timing of the switching operations of switches $Sw_1$, 371 and $Sw_2$ 372 of switching circuit 370. For example, in this embodiment, the switching clock circuit 380 includes an oscillator 381 and gate 382. Alternatively, the switching clock circuit 380 may include a clock source, such as a spread spectrum clock source (e.g., pseudo-random signal (PRS)), a frequency divider, a pulse width modulator (PWM), or the like. The output 392 of the sigma-delta modulator 360 is used with an oscillator signal to gate a control signal 393, which switches the switches $Sw_1$, 371 and $Sw_2$ 372 in a non-overlapping manner (e.g., two, non-overlapping phases). The output 392 of the sigma-delta modulator 360 is also output to digital filter 390, which filters and/or converts the output into the digital code 391.

In one embodiment of the method of operation, at power on, the modulator capacitor 363 has zero voltage and switching capacitor resistor (formed by sensing capacitor Cx 351, and switches $Sw_1$ 371 and $Sw_2$ 372) is connected between Vdd line 366 and modulator capacitor 363. This connection allows the voltage on the modulator capacitor 363 to rise. When this voltage reaches the comparator reference voltage, $V_{ref}$ 364, the comparator 361 toggles and gates the control signal 393 of the switches $Sw_1$ 371 and $Sw_2$ 372, stopping the charge current. Because the current via bias resistors $R_b$ 365 continues to flow, the voltage on modulator capacitor 363 starts dropping. When it drops below the reference voltage 364, the output of the comparator 361 switches again, enabling the modulator 363 to start charging. The latch 362 and the comparator 361 set sample frequency of the sigma-delta modulator 360.

The digital filter 390 is coupled to receive the output 392 of the sigma-delta modulator 360. The output 392 of the sigma-delta modulator 360 may be a single bit bit-stream, which can be filtered and/or converted to the numerical values using a digital filter 390. In one embodiment, the digital filter 390 is a counter. In another embodiment, the standard Sinc digital filter can be used. In another embodiment, the digital filter is a decimator. Alternatively, other digital filters may be used for filtering and/or converting the output 392 of the sigma-delta modulator 360 to provide the digital code 391. It should also be noted that the output 392 may be output to the decision logic 402 or other components of the processing device 210, or to the decision logic 451 or other components of the host 250 to process the bitstream output of the sigma-delta modulator 360. While a CSR oscillator is used to describe certain embodiments of the invention, the aspects of the invention described herein are applicable to other oscillator types that translate capacitance changes to raw count changes.

Figure 4:
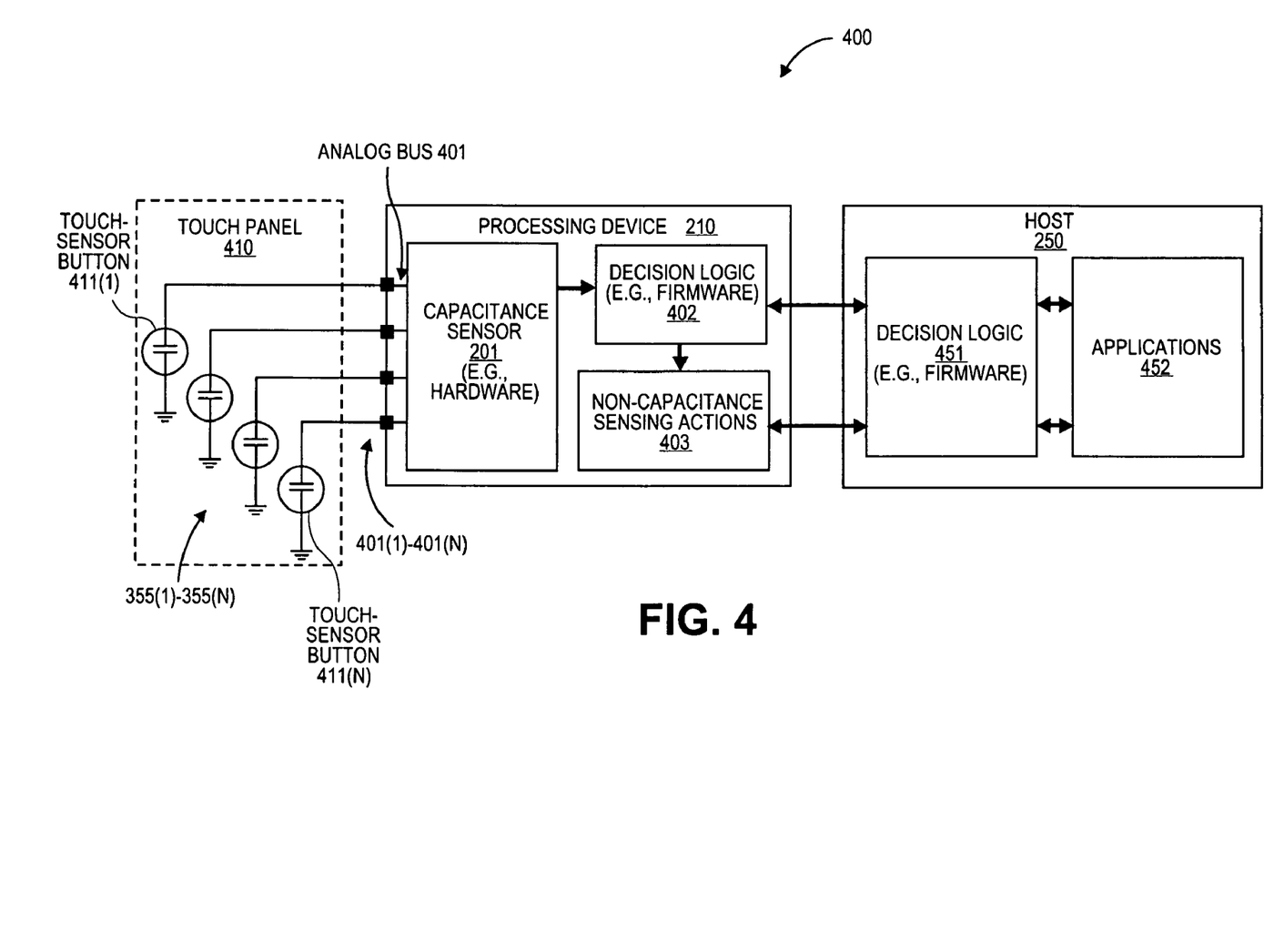
FIG. 4 illustrates a block diagram of one embodiment of an electronic device including a processing device that includes capacitance sensor for measuring the capacitance on a touch panel.

FIG. 4 illustrates a block diagram of one embodiment of an electronic device 400 including a processing device 210 that includes capacitance sensor 201 for measuring the capacitance on a touch panel 410. The electronic device 400 of FIG. 4 includes a touch panel 410, processing device 210, and host 250. Touch panel 410 includes sensor elements 355(1)-355(N), where N is a positive integer value that represents the number of touch-sensor buttons 411(1)-411(N) of the touch panel 410. Each sensor element is represented as a capacitor, as described above with respect to FIG. 3A. The touch panel 410 is coupled to processing device 210 via an analog bus 401 having multiple pins 401(1)-401(N).

Processing device 210 may reside on a common carrier substrate such as, for example, an integrated circuit (IC) die substrate, a multi-chip module substrate, or the like. Alternatively, the components of processing device 210 may be one or more separate integrated circuits and/or discrete components. In one exemplary embodiment, processing device 210 may be a Programmable System on a Chip (PSoC™) processing device, manufactured by Cypress Semiconductor Corporation, San Jose, Calif. Alternatively, processing device 210 may be one or more other processing devices known by those of ordinary skill in the art, such as a microprocessor or central processing unit, a controller, special-purpose processor, digital signa 1 processor (DSP), an application specific integrated circuit (ASIC), a field programmable gate array (FPGA), or the like. In an alternative embodiment, for example, the processing device may be a network processor having multiple processors including a core unit and multiple microengines. Additionally, the processing device may include any combination of general-purpose processing device(s) and special-purpose processing device(s).

It should also be noted that the embodiments described herein are not limited to having a configuration of a processing device coupled to a host, but may include a system that measures the capacitance on the sensing device and sends the raw data to a host computer where it is analyzed by an application. In effect the processing that is done by processing device 210 may also be done in the host.

In one embodiment, the capacitance sensor 201 includes a selection circuit. The selection circuit is coupled to the sensor elements 355(1)-355(N) and the sensing circuitry of the capacitance sensor 201. Selection circuit may be used to allow the capacitance sensor to measure capacitance on multiple sensor elements of multiple touch-sensor buttons. The selection circuit may be configured to sequentially select a sensor element to provide the charge current and to measure the capacitance of the selected sensor element. In one exemplary embodiment, the selection circuit is a multiplexer array. Alternatively, selection circuit may be other circuitry inside or outside the capacitance sensor 201 to select the sensor element to be measured. In another embodiment, one capacitance sensor 201 may be used to measure capacitance on all of the sensor elements of the touch panel. Alternatively, multiple capacitance sensors 201 may be used to measure capacitance on the sensor elements of the touch panel. The multiplexer array may also be used to connect the sensor elements that are not being measured to the system ground. This may be done in conjunction with a dedicated pin in the GP10 port 207.

In another embodiment, the capacitance sensor 201 may be configured to simultaneously sense the sensor elements, as opposed to being configured to sequentially sense the sensor elements as described above. Alternatively, other methods for sensing known by those of ordinary skill in the art may be used to scan the sensing device.

In one embodiment, the processing device 210 further includes a decision logic block 402. The operations of decision logic block 402 may be implemented in firmware; alternatively, it may be implemented in hardware, software or a combination thereof. The decision logic block 402 may be configured to receive the digital code or counts from the capacitance sensor 201, and to determine the state of the touch panel 410, such as whether a conductive object is detected on the touch panel, whether a touch-sensor button or multiple touch-sensor buttons have been activated as described in greater detail below.

In another embodiment, instead of performing the operations of the decision logic 402 in the processing device 210, the processing device 201 may send the raw data to the host 250, as described above. Host 250, as illustrated in FIG. 4, may include decision logic 451. The operations of decision logic 451 may also be implemented in firmware, hardware, and/or software. Also, as described above, the host may include high-level APIs in applications 452 that perform routines on the received data, such as compensating for sensitivity differences, other compensation algorithms, baseline update routines, start-up and/or initialization routines, interpolations operations, scaling operations, or the like. The operations described with respect to the decision logic 402 may be implemented in decision logic 451, applications 452, or in other hardware, software, and/or firmware external to the processing device 210.

In another embodiment, the processing device 210 may also include a non-capacitance sensing actions block 403. This block may be used to process and/or receive/transmit data to and from the host 250. For example, additional components may be implemented to operate with the processing device 210 along with the touch panel 410 (e.g., keyboard, keypad, mouse, trackball, LEDs, displays, or the like).

At startup (or boot) the sensor elements (e.g., capacitors 355(1)-(N)) are scanned and the count values for each sensor element with no activation are stored as a baseline array (Cp). The presence of a finger on a sensor element button is determined by the difference in counts between a stored value for no sensor element activation and the acquired value with sensor element activation, referred to here as Δn. The sensitivity of a single sensor element button is approximately:

$$\frac{\Delta n}{n} = \frac{Cf}{Cp} \quad (14)$$

The value of Δn should be large enough for reasonable resolution and clear indication of sensor element activation. This drives sensor element construction decisions. Cf should be as large a fraction of Cp as possible. Since Cf is determined by finger area and distance from the finger to the sensor element's conductive traces (through the over-lying insulator), the baseline capacitance Cp should be minimized. The baseline capacitance Cp includes the capacitance of the sensor element plus any parasitics, including routing and chip pin capacitance.

Figure 5A:
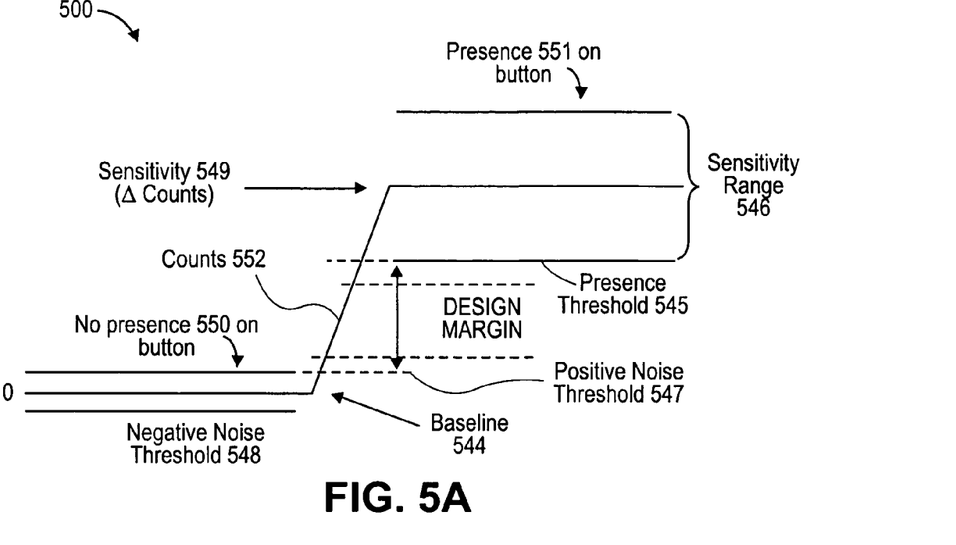
FIG. 5A illustrates a graph of a sensitivity of a single touch-sensor button.

FIG. 5A illustrates a graph of a sensitivity of a single sensor button. Graph 500 includes the counts 552 as measured on a single sensor button for "no presence" 550 on the sensor button, and for "presence" 551 on the sensor button. "No presence" 550 is when the sensing device does not detect the presence of the conductive object, such as a finger. "No presence" 550 may be detected between a range of noise. The range of noise may include a positive noise threshold 547 and a negative noise threshold 548. So long as the counts 552 are measured as being between the positive and negative thresholds 547 and 548, the sensing device detects "no presence" 550. "Presence" 551 is when the sensing device detects the presence of the conductive object (e.g., finger). "Presence" 551 is detected when the counts 552 are greater than a presence threshold 545. The presence threshold 545 indicates that a presence of a conductive object is detected on the sensing device. The sensitivity 549 (Cf/Cp) of the single button operation may be such that when it detects the presence of the conductive object, the capacitance variation (Δn) is above the presence threshold 545. Alternatively, the button operation may be activated when a tap gesture is recognized on the touch-sensor button. The sensitivity 549 may have a range, sensitivity range 546. Sensitivity range 546 may have a lower and upper limit or threshold. The lower threshold is equal to or greater than the presence threshold 545, allowing a "presence" 551 to be detected on the touch-sensor button. The sensing device may be configured such that there is a design margin between the presence threshold 545 and the positive noise threshold 547. The sensitivity range 546 is based on the surface area of the touch-sensor button.

Figure 5B:
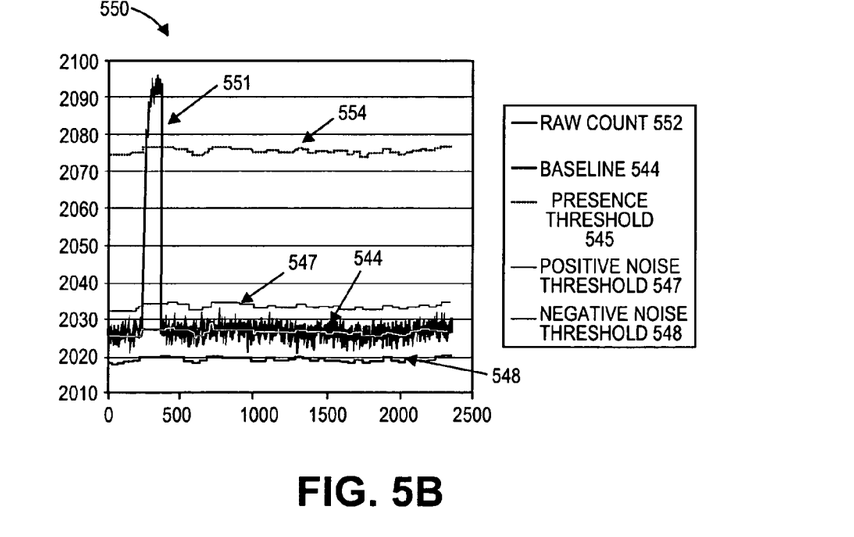
FIG. 5B illustrates a graph of capacitance measured on a single touch-sensor button.

FIG. 5B illustrates a graph of capacitance measured on a single sensor button. Graph 550 illustrates the measured capacitance as raw counts 552, as well as the baseline 544, the presence threshold 545, positive noise threshold 547, and the negative noise threshold 548. A baseline, or reference, may be tracked so the computing device knows when the user interaction is present (e.g., finger on button) by comparing the CSR raw counts (representing the capacitance due to the presence of a conductive object, such as user's finger) with the baseline. If the CSR raw counts exceed the baseline by a finger threshold, user interaction is deemed to be present and appropriate actions are taken; otherwise, no action is taken. In one embodiment, the baseline may be established during the warming-up phase immediately after power-on.

As illustrated in graph 550, the raw counts 552 increase above the presence threshold 545 which, for example, is at approximately 2075 counts, the presence of the finger is detected on the sensing device. Although the presence threshold 545 is illustrated as being at 2075, and the baseline at 2025, other values may be used. When a finger presses one button, a difference count, which is the raw count minus the baseline count, of this button is above a finger presence threshold, so a finger presence is detected. Software may be used to determine the button with the largest difference count that is intended to be triggered by a user such that an operation associated with that button is activated. In one embodiment of the present invention, if a finger (or other conductive object) presses both a first button and a second button such that the difference count of the first button and the second button are both above the finger threshold, the button which has the largest difference count will be triggered. In other words, in order to avoid miss triggering the operation associated with the button that was not intended to be activated, only the button with the largest difference count will be triggered. In such an embodiment, each of the sensor buttons is scanned to determine an activation signal value (e.g., a count output from the digital counter) is above the presence threshold 545. The count values from each of the activated buttons are compared to determine which has the greater value, for example using decision logic 402. The operation associated with the button determined to have the greater count value is then triggered, for example, by sending a signal or command from block 403 to host 250. As noted above, the steps of this method may be performed by decision logic 402 of processing device 210 and/or decisions logic 451 of host 250 or a combination thereof.

According to an alternative embodiment of the present invention, the use of a difference threshold determination is introduced to improve robustness and aid in avoiding miss triggering. In such an embodiment, only when the difference in raw counts between the pressed buttons is above a difference threshold, the button that has the largest count will be triggered. Alternatively, other count numbers can be subtracted and compared against a difference threshold, for example, the difference in difference count for each pressed button can be analyzed to determine if it is above the difference threshold (e.g., difference count of button A minus the difference count of button B is compared against a difference threshold). This can confirm that the triggered button is the most pressed button.

In one embodiment, if the difference count between button A and button B are below a threshold, then the button presses may be omitted or a priority may be introduced for some buttons at a specific condition. For example when some function button is trigged, and then both the function button and an OK button are triggered, the OK button may be selected.

Figure 6:
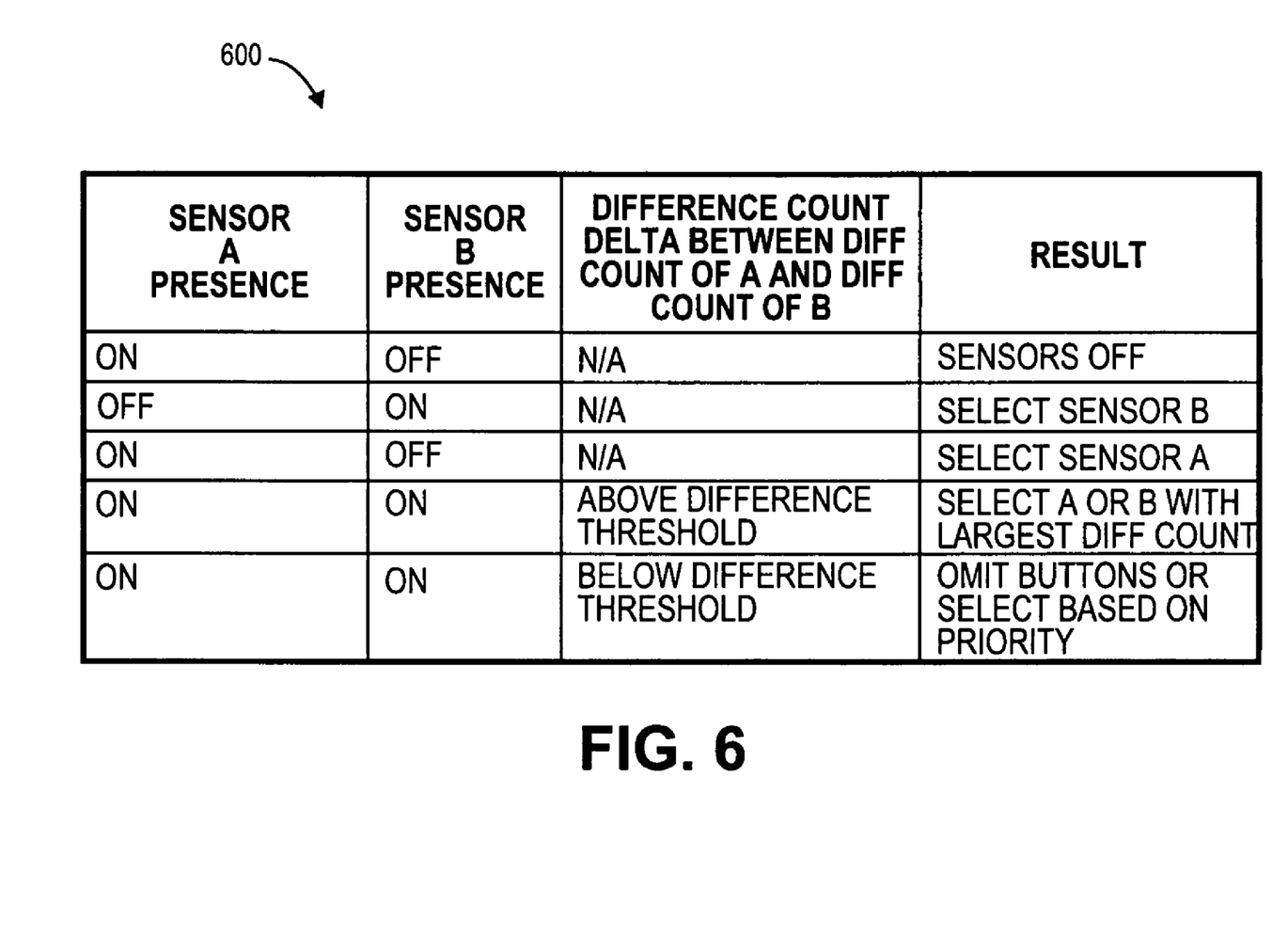
FIG. 6 illustrates a logic truth table for discriminating between two button activations according to one embodiment of the present invention.

FIG. 6 illustrates a logic truth table for discriminating between two button activations according to one embodiment of the present invention. The logic truth table 600 of FIG. 6 shows the different results when the difference count delta between two button sensors elements A and B is either above or below a difference threshold count. As shown by the second and third rows of table 600, if only one of buttons A or B is detected to have a presence of a conductive object (reflected as "ON" in the table), then comparison with a difference delta is not performed is it is not applicable ("N/A") and the sensor button with the detected presence is selected for activation of an operation associated with that sensor button. As shown by the fourth and fifth rows of table 600, if both of buttons A and B are detected to have a presence (e.g., raw count minus the baseline count of the buttons are above a finger presence threshold), then the difference count delta between the difference count of button A and the difference count of button B is compared against a difference threshold. As described above, if the difference count delta is above the difference threshold, the button that has the largest difference count will be selected. Otherwise, if the difference count delta is below the difference threshold, then the button presses may be omitted or one of the buttons may be selected based on the button have a higher assigned priority.

The difference threshold can be set based on the difference count delta count number between pressed buttons (difference count of button A—difference count of button B) or a difference count delta percentage (difference count of button A/difference count of button B, or difference count delta/difference count of A plus the difference count of B). As one example, the difference threshold can be set to 30 in difference counts or 1.2 in terms of percentage. Alternatively, other count values and percentages may be used.

Figure 7:
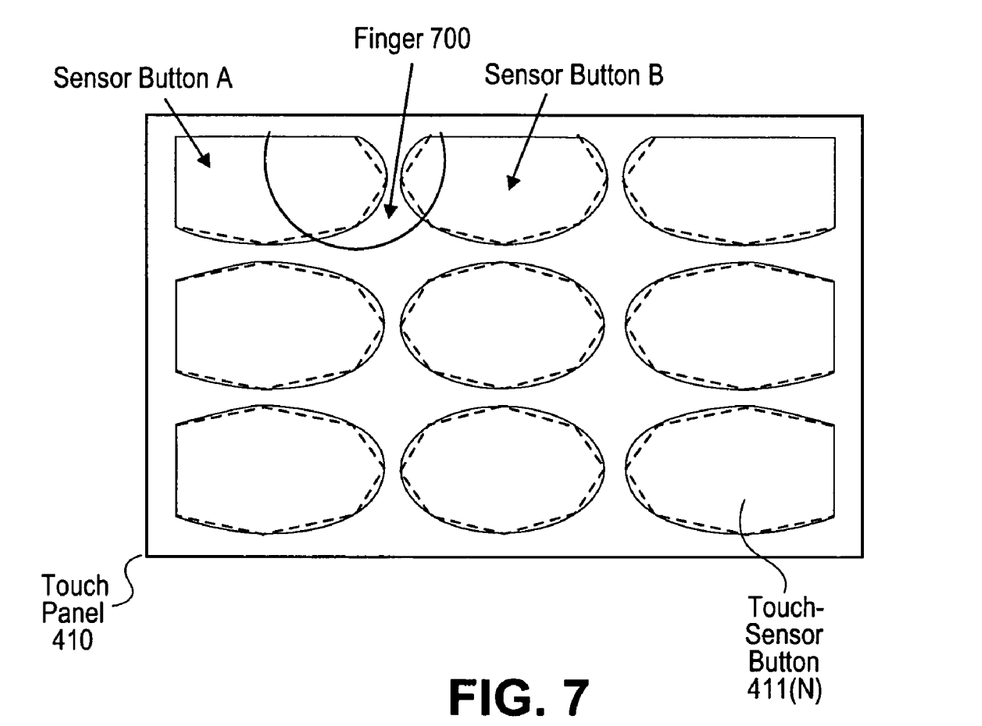
FIG. 7 illustrates substantially oval shapes that may be used for adjacent buttons on a touch panel according to one embodiment of the present invention.

In an alternative embodiment, accessorial layout of the sensor buttons can increase robust of discriminating a selection among multiple buttons (e.g., sensor button A and sensor button B) that are pressed by a finger 700. In this embodiment, an oval button shape or linear piece wise shape approximating an oval may be used for adjacent buttons (e.g., sensor button A and sensor button B) as illustrate in FIG. 7. FIG. 7 illustrates a substantially oval button shape that may be used for adjacent buttons on a touch panel according to one embodiment of the present invention. Both a curved perimeter and a linear piece wise perimeter segments forming a substantially oval shape are shown in the figure. In the exemplary figure, eight linear piece wise segments forming an octagon are used to approximate the oval shape. Alternatively, other numbers of piece wise segments forming other polygons may be used.

The use of non-rectangular shapes for the sensor buttons can increase the difference count denoted in percentage between pressed buttons. For example, if a rectangular button shape is used, the percentage may be set equal the difference count of A/difference count of B, or alternatively, the percentage may be set equal the difference count delta of A&B/difference count of A plus the difference count of B. When using the layout of FIG. 7, the percentage may be set equal to difference count of A–a constant)/(difference count of B–a constant). Alternatively, the percentage may be set equal to the difference count delta/(difference count of A plus the difference count of B–a constant), resulting in a percentage ratio, for example, of 10/6<9/5 or 4/10<4/9). Compared to rectangular shaped sensor buttons, the layout of FIG. 7 has the same difference count delta for buttons A and B (i.e., difference count of A minus the difference count of B), but a lower ratio of the difference count of button A divided by the difference count of button B. Therefore, the percentage of (the difference count of button A/difference count of button B, or difference count delta/difference count of A plus the difference count of B) can be improved.

Embodiments of the present invention, described herein, include various operations. These operations may be performed by hardware components, software, firmware, or a combination thereof. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a machine-readable medium. These instructions may be used to program a general-purpose or special-purpose processor to perform the described operations. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; electrical, optical, acoustical, or other form of propagated signal (e.g., carrier waves, infrared signals, digital signals, etc.); or another type of medium suitable for storing electronic instructions.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method of discriminating a selection from among a plurality of pressed buttons, comprising:
   determining whether a first button of the plurality of pressed buttons has a first activation signal value above a presence threshold;
   determining whether a second button of the plurality of pressed buttons has a second activation signal value above the presence threshold;
   calculating a difference value between the first activation signal value and the second activation signal value; and
   if both the first and second activation signal values are above the presence threshold and the difference value is above a difference threshold:
      determining which of the first activation signal value and the second activation signal value is a greater value; and
      triggering a respective operation associated with either the first button or the second button determined to have the greater signal activation value.

2. The method of claim 1, further comprising:
   if the difference value is below the difference threshold, omitting triggering of the respective operation associated with either the first button or the second button.

3. The method of claim 1, further comprising:
   assigning a priority to each of the operations associated with the plurality of buttons; and
   triggering the respective operation associated with either the first button or the second button having a greater priority with respect to each other.

4. The method of claim 1, wherein calculating the difference value between the first activation signal value and the second activation signal value comprises subtracting the first activation signal value and the second activation signal value.

5. The method of claim 1, wherein calculating the difference value between the first activation signal value and the second activation signal value comprises calculating a percentage using the first activation signal value to the second activation signal value.

6. The method of claim 1, wherein the first and second activation signals values are digital count values.

7. The method of claim 6, wherein the difference threshold is approximately 30 counts.

8. The method of claim 6, wherein first activation signal value is a first difference count comprising a first raw count minus a baseline count, and wherein the second activation signal value is a second difference count comprising a second raw count minus the baseline count.

9. The method of claim 8, wherein the difference value is the first difference count minus the second difference count.

10. The method of claim 8, wherein the difference value is the first difference count divided by the second difference count.

11. The method of claim 8, wherein the difference value is the first difference count divided by, the first difference count plus the second difference count.

12. The method of claim 1, wherein the plurality of pressed buttons comprise capacitive sensors.

13. The method of claim 8, wherein each of the plurality of pressed buttons comprises a capacitive sensor having a substantially oval shape and wherein the difference value is the first difference count minus a first constant, divided by, the second difference count minus a second constant.

14. The method of claim 8, wherein each of the plurality of pressed buttons comprises a capacitive sensor having a substantially oval shape and wherein the difference value is the first difference count minus the second difference count, divided by, the first difference count plus the second difference count minus a constant.

15. A non-transitory computer readable medium comprising data that, when accessed by the computer, cause the computer to perform operations comprising:
   determining whether a first button of the plurality of pressed buttons has a first activation signal value above a presence threshold;
   determining whether a second button of the plurality of pressed buttons has a second activation signal value above the presence threshold;
   calculating a difference value between the first activation signal value and the second activation signal value; and
   if both the first and second activation signal values are above the presence threshold and the difference value is above a difference threshold:
      determining which of the first activation signal value and the second activation signal value is a greater value; and
      triggering a respective operation associated with either the first button or the second button determined to have the greater signal activation value.

16. The non-transitory computer readable medium of claim 15, wherein the data, when accessed by the computer, cause the computer to perform operations further comprising:
   if the difference value is below the difference threshold, omitting triggering of the respective operation associated with either the first button or the second button.

17. The non-transitory computer readable medium of claim 15, wherein the data, when accessed by the computer, cause the computer to perform operations further comprising:
   assigning a priority to each of the operations associated with the plurality of buttons; and
   triggering the respective operation associated with either the first button or the second button having a greater priority with respect to each other.

18. An apparatus, comprising:
   a first touch sensor button configured to receive a first activation signal representative of the presence of a conductive object;
   a second touch sensor button configured to receive a second activation signal representative of the presence of the conductive object; and
   a processing device coupled with the first and second touch sensor buttons, the processing device to receive the first and second activation signals and, if both the first and second activation signals are above a presence threshold and a difference between the first and second activation signals is above a difference threshold:
      to determine which of the first activation signal and the second activation signal has a greater value; and
      to trigger a respective operation associated with either the first touch sensor button or the second touch sensor button determined to have the greater value.

19. The apparatus of claim 18, wherein the processing device comprises:
   a relaxation oscillator coupled with the first and second touch sensor buttons, wherein the relaxation oscillator comprises:
      a current source to provide a charge current to the first and second touch sensor buttons;
      a selection circuit coupled to first and second touch sensor buttons and the current source, wherein the selection circuit is configured to sequentially select one of the first and second touch sensor buttons to provide the charge current and to measure the capacitance of each of the first and second touch sensor buttons;

a comparator coupled to the current source and the selection circuit, wherein the comparator is configured to compare a voltage on the selected touch sensor button and a threshold voltage corresponding to the presence threshold; and a reset switch coupled to the comparator, current source, and selection circuit, wherein the reset switch is configured to reset the charge current on the selected touch sensor button; and a digital counter coupled to the relaxation oscillator, wherein the digital counter is configured to count at least one of a frequency or a period of a relaxation oscillator output received from the relaxation oscillator.

20. The apparatus of claim 19, wherein the first and second touch sensor buttons are adjacent each other on a touch sensor panel, and wherein each of the first and second touch sensor buttons has a substantially oval shape.

* * * * *